United States Patent [19]

Schilling

[11] Patent Number: 5,160,453

[45] Date of Patent: Nov. 3, 1992

[54] CATIONIC AQUEOUS BITUMINOUS EMULSION-AGGREGATE SLURRIES

[75] Inventor: Peter Schilling, Charleston, S.C.

[73] Assignee: Westvaco Corporation, New York, N.Y.

[21] Appl. No.: 312,817

[22] Filed: Feb. 21, 1989

[51] Int. Cl.$^5$ .................. B01J 13/00; B01F 17/28; C08L 95/00; C09D 201/00
[52] U.S. Cl. .................. 252/311.5; 252/351; 252/357; 106/273.1; 106/277
[58] Field of Search .................. 252/311.5, 351, 357; 106/273.1, 277

[56] References Cited

U.S. PATENT DOCUMENTS

| | | | |
|---|---|---|---|
| 3,928,061 | 12/1975 | Hellsten et al. | 252/311.5 X |
| 4,447,269 | 5/1984 | Schreuders et al. | 106/277 |
| 4,450,115 | 5/1984 | Schilling et al. | 106/269 |
| 4,462,840 | 7/1984 | Schilling et al. | 106/277 |
| 4,464,286 | 8/1984 | Schilling | 252/311.5 |
| 4,523,957 | 6/1985 | Graf et al. | 252/311.5 X |
| 4,547,224 | 10/1985 | Schilling | 252/311.5 X |
| 4,597,799 | 7/1986 | Schilling | 106/277 |
| 4,639,273 | 1/1987 | Gilmore et al. | 106/282 X |
| 4,789,402 | 12/1988 | Kostusyk | 106/273.1 |
| 4,810,299 | 3/1989 | Schilling et al. | 106/277 |

Primary Examiner—Robert L. Stoll
Assistant Examiner—Daniel S. Metzmaier
Attorney, Agent, or Firm—Terry B. McDaniel; Daniel B. Reece, IV; Richard L. Schmalz

[57] ABSTRACT

Cationic aqueous bituminous emulsion-aggregate slurries are disclosed to be formed with cationic emulsions prepared at elevated temperatures by emulsifying bitumen, such as an asphalt, in water with a cation-active emulsifier which is the product of the reaction of modified polyamine with certain plycarboxylic acids and anhydrides. The modified polyamines are obtained by reacting suitable polyalkylene amines with aldehydes, preferentially formaldehyde and glyoxal.

6 Claims, No Drawings

CATIONIC AQUEOUS BITUMINOUS EMULSION-AGGREGATE SLURRIES

BACKGROUND OF THE INVENTION (1) Field of the Invention

The present invention relates to mixing-grade, quick-setting and cationic aqueous bituminous emulsion-aggregate paving slurry seal mixtures. More particularly, this invention relates to said paving slurry seal mixtures formed with cationic emulsions prepared by emulsifying bitumen, such as an asphalt, in water with a cation-active emulsifier which is the product of the reaction of polyamine/aldehyde condensates with tall oil fatty acids and certain polycarboxylic acids.

(2) Description of the Prior Art

Conventionally, emulsion slurry seals are formulated from (1) mineral aggregate which is a fine stone aggregate and/or mineral filler and (2) about 15% to about 25% by weight thereof of a mixing-grade, slow-setting emulsion containing from about 50% to about 75% by weight of bituminous residue (usually asphalt), with a further addition of about 5% to about 25% of water, based on the weight of the dry aggregate, to attain slurry consistency. Usually, densely-graded aggregates, such as granite screenings, limestone screenings, dolomite screenings and blast furnace slag, are combined with bituminous emulsions to produce slurry seal compositions. These aggregates range in size from anything passing through a sieve of No. 4, and even No. 10 mesh, with from 15% to 20% passing through as fine a mesh as 200 mesh, as described in ASTM C136.

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such a mixture with aggregate, the aqueous emulsion form of the bituminous material has been generally preferred because it is less hazardous and more economical use than hot mix or cutback (solvent containing) asphalts. Further, the aqueous emulsion form can be stored, transported and applied at much lower temperatures, obviating the necessity of heating equipment to maintain a bitumen-aggregate system in a workable or usable form. While these advances have been recognized, widespread acceptance has not been achieved due to disadvantages found in previous aqueous bituminous emulsions.

More recently, cationic bituminous emulsions have come into use and eliminate many of the disadvantages of the anionic emulsions. Bituminous emulsions formulated using cationic emulsifiers do not "break" in the same manner as anionic emulsions, but rather the bituminous material is deposited from the emulsion due to the attraction of polar charges between the bituminous droplets and negatively charged aggregate surfaces. Thus, cationic bituminous emulsions deposit more rapidly than the anionic bituminous emulsions on aggregate surfaces and are bonded the aggregate by the electrostatic action at the interface of the bitumen and the aggregate material.

The aqueous cationic bituminous emulsions themselves are relatively stable, and the emulsion stability may be enhanced by various additives well known in the art. Most cationic bituminous emulsions, however, deposit on the surface of aggregate materials rapidly when aggregate is contacted with the emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as seal coats, since the roads can be opened to traffic shortly after application of the coating. Although the rate of asphalt deposition, for example, from the emulsion can be controlled to some extent, the time required for complete deposition is never very long and it is therefore the practice to combine the cationic emulsion with the aggregate at the site of road construction, either on the surface of the road itself, or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable properties for use in conjunction with some aggregates, the same cationic emulsion may not exhibit suitable properties when used with very finely ground materials having vastly larger total surface area. The rapid deposition characteristics of the cationic bituminous emulsions frequently makes it impossible to use such emulsions with fine-grained aggregate in slurry form such as in gun application or spreader box application. Therefore, since the slurry seal should mix well, pump well, lay down well, not stiffen while being applied, and, after setting, wear well under traffic, it is particularly desirable to be able to control the setting time of the slurry for various aggregates employed.

Acidified reaction products of polycarboxylic acids and anhydrides thereof with certain polyamines as described above are suitable emulsifiers yielding asphalt emulsions which can be mixed with fine grained aggregate to give workable aggregate/ emulsion mixes.

These emulsifiers generally are disclosed in U.S. Pat. No. 4,447,269 to Schreuders, et al., U.S. Pat. No. 4,450,011 to Schilling, et al., U.S. Pat. No. 4,547,224 to Schilling, et al., U.S. Pat. No. 4,462,840 to Schilling, et al., U.S. Pat. No. 4,464,286 to Schilling; and U.S. Pat. No. 4,597,799 to Schilling.

However, the synthesis of these modified fatty acids affords a costly separate reaction step which involves fumarization, maleinization, sulfonation or epoxidation of unsaturated fatty acids or esters (glycerides) prior to the amidation reaction. Accordingly, an object of this invention is to provide novel types of emulsifiers which were prepared from unmodified fatty acids and modified polyamines (i.e., pre-reacted with aldehydes such as formaldehyde or glyoxal).

A further object of this invention is to provide new types of emulsifiers prepared from the modified polyamines and the above described polycarboxylic acids and the anhydrides thereof which produce emulsifiers with desired properties.

A further object of this invention is to provide a novel mixture of aggregate and bituminous emulsion.

A further object is to provide a mixture of the above character which is workable under a broad range of conditions.

Another object is to provide a mixture of cationic bituminous emulsion and aggregate whose setting time can be varied.

A particular object is to provide an aqueous bituminous emulsion fine-grained aggregate slurry mixture which deposits at a fairly rapid rate after being applied to the surface to be treated, and is suitable for a longer period of time to enable application in slurry form.

SUMMARY OF THE INVENTION

The above objectives are met in the cationic aqueous bituminous emulsion-aggregate slurries formed with cationic emulsions prepared by emulsifying bitumen, such as an asphalt, in water with a novel cation-active emulsifier which is the product of the reaction of modified polyamine obtained by treating a polyalkylene amine with an aliphatic or aromatic aldehyde, preferentially formaldehyde or glyoxal, with tall oil fatty acids or with a member of the group consisting of polycarboxylic acids and anhydrides of the general formulae

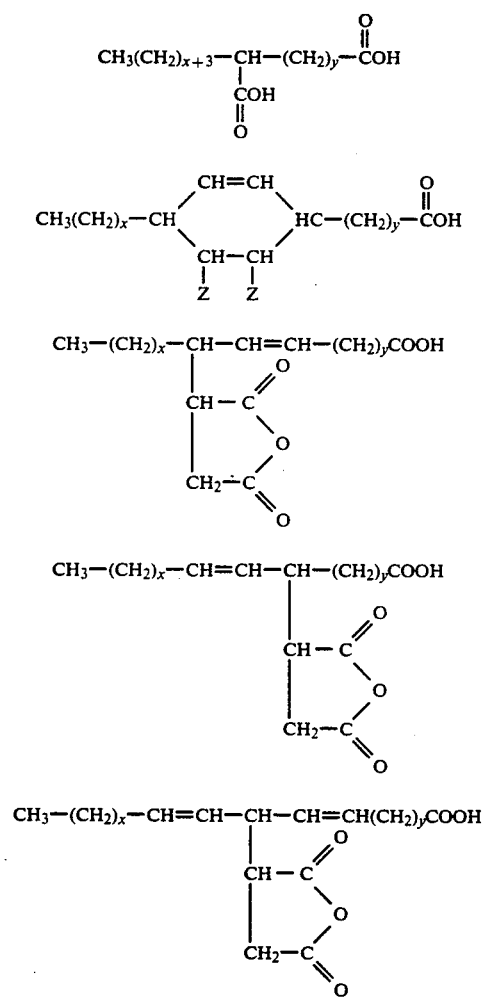

and

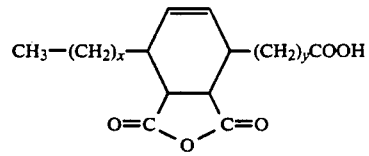

wherein x and y are integers from 3 to 9, x and y together equal 10–14, at least one Z is a carboxylic acid group and any remaining Z is hydrogen.

DESCRIPTION OF THE PREFERRED EMBODIMENTS

A typical cationic aqueous bituminous emulsion aggregate slurry is formulated in the laboratory with an amount of aggregate pre-wetted with water and mixed with a suitable cationic bituminous emulsion to a desired consistency. Suitable consistency is obtained by using mixed gradations of aggregates forming a smooth non-separating uniform mixture of cationic aqueous bituminous emulsion-aggregate which can be evenly spread onto an existing surface. The ultimate toughness of the applied slurry is obtained as the bitumen, such as asphalt, deposits on the aggregate particles and binds the newly applied coating on the pre-existing surface as a mixture of asphalt cement and aggregate.

As a paving technique at the roadsite, a mobile self-propelled unit capable of uniformly metering the aggregate, water, inorganic or organic additive and emulsion components may be used. A typical unit is equipped with separate tanks for aggregate, water, additive and emulsion which are continually metered into a mixing chamber at a pre-determined ratio. The continually fed components are retained in the mixing chamber for approximately one minute and then fed into a spreader box and applied to the surface to be coated. Batch operated pneumatic devices can also be used for suitable placement of the cationic bituminous aggregate slurries of this invention.

The slurry of this invention broadly comprises aggregate and a bituminous emulsion made up of bitumen, water and as cationic emulsifier, the reaction product of a modified polyamine and fatty acid or a polycarboxylic acid as described above in the Summary of the Invention.

The modified polyamines are obtained by reacting aliphatic and aromatic aldehydes, preferentially formaldehyde and glyoxal. The reaction is carried out by adding the reactive aldehyde slowly to the polyamine or polyamine blends at temperatures between 25° and 100° C. and heating to 150° C. whereby water distills from the reaction mixture. The main reaction is the methylene-crosslinking between amine moieties resulting in polyamine products with increased molecular weight.

The reaction products of aminoethylpiperzine with formaldehyde and triethylene tetramine with glyoxal may be used as general examples.

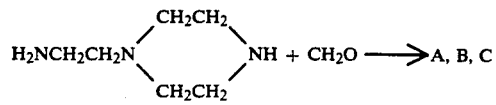

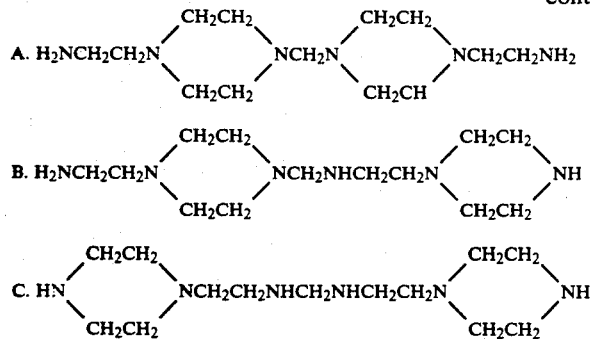

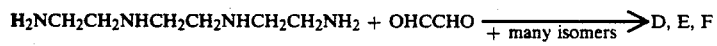

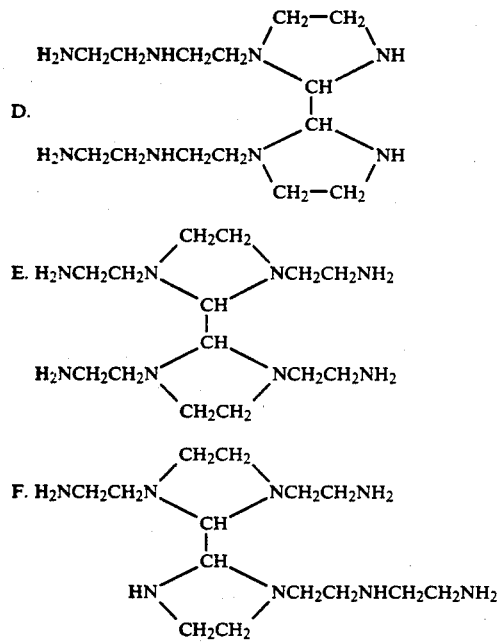

Polyamines suitable as precursors are those which are able to form imidazolines or amidoamines with carboxylic acids such as ethylene diamine, diethylene triamine, triethylene tetramine, tetraethylene pentamine, pentaethylene hexamine, and higher homologues; N-aminoethyl propane diamine, N,N′-diaminoethyl propane diamine and the N-aminoethyl- or N,N′-diaminoethyl-substituted butane diamines, pentane diamines and hexane diamines, and N-hydroxyethyl ethylene diamine. These compounds have the general formula $H_2NCH_2CH_2NHR$ $R = H-$, $CH_3-$, $C_2H_5-$, $C_3H_7-$,
$-CH_2CH_2OH$, $-(CH_2CH_2NH)_xH$
$x = 1, 2, 3, 4, \ldots 10$ or,
$R_1R_2N(CH_2)_yNHR_3$
$R_1 = H-$, $CH_3-$, $C_2H_5-$, $C_3H_7-$, $NH_2CH_2CH_2-$,
$R_2 = H-$, $CH_3-$, $C_2H_5-$,
$R_3 = H-$, $CH_3-$, $C_2H_5-$, $C_3H_7-$, $NH_2CH_2CH_2-$,
$y = 2, 3, 4, 5, 6.$ Amines capable of forming amidoamines but not imidazolines are: 1,3-diaminopropane, 1,4-diaminobutane, 1,5-diaminopentane, 1,6-diaminohexane, piperazine (1,4-diazacyclohexane), N-aminoethylpiperazine, N-hydroxyethyl piperazine, N-aminopropyl-propane diamine-1,3, N-methyl-N-aminopropylpropane diamine-1,3, N-aminohexylhexane diamine-1,6.

In addition, polyamines containing other functionalities such as (—O—), thioether (—S—), sulfoxide (—SO—), sulfone (—SO$_2$—) groups, as well as aromatic structures are also suitable for condensation.

$$R_1H_2N(CH_2)_xY(CH_2)_zNH_2$$

$Y = O, S, SO, SO_2, C_6H_4—$
$x = 2-10$
$z = 2-10$

Further modification of the above described polyamino amidoamines are their reaction products with reactive oxirane systems such as ethylene oxide, propylene oxide or butylene oxide. Reaction occurs initially on primary or secondary nitrogens, that is, a nitrogen to which one or two hydrogen atoms are covalently bound. The reaction products belong to the class of N-hydroxyethyl-, N-2-hydroxypropyl- and N-2- hydroxybutyl -amino amidoamines. If excess oxirane is reacted, polyethylene oxides, polypropylene oxides or polybutylene oxides are obtained. The hydroxyl groups will also react in this case.

Another modification may involve the use of an alkylating agent such as methyl-, ethyl-, or benzyl halides, sulfates, phosphates, etc. The resulting compounds are classified as mono-, di-, tri- or polyquaternary ammonium salts. Their main characteristic is their solubility in aqueous systems without addition of acid, as is the case with amines and amidoamines. The use of reactive products of polyamine/alehyde condensates with fatty acids or esters and the above described $C_{19}$-, $C_{21}$-, $C_{22}$-polycarboxylic acid and anhydrides as asphalt emulsifiers, and specifically as emulsifiers for solventless asphalt emulsions and emulsions for slurry seal applications, was heretofore unknown.

The examples which follow are illustrative to emulsifiers used to obtain cationic asphalt in water emulsions eminently useful for mixing under shear with a variety of siliceous and calcareous aggregates. After setting (evaporation of water), the asphalt films show excellent adhesion to the aggregate surface.

In preparing the bituminous emulsions employed in the invention paving slurry seal mixtures, an aqueous acidic solution of the emulsifiers described below is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.5–2% by weight of the emulsion. Dependent on the emulsifier, a slurry grade emulsion is obtained in a pH range of 2–7, with the optimum performance at a pH of about 2.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use in pavement construction as described in ASTM designation D-3381 and D-946 may be emulsified with the aid of the emulsifiers of this invention.

The cationic soap solutions are normally obtained by suspending the fatty acid/polyamine condensates in water to which a sufficient amount of a suitable acid, for instance, hydrochloric, sulfuric, and phosphoric acid or the like is added until the desired pH value below 7 is reached and a clear emulsifier solution is obtained. Thereafter, the soap solution which is preheated to 55° C. and the fluid asphalt which is preheated to 120–125° C. are mixed under high shear in a colloid mill to give asphalt emulsions of brown color and creamy texture. Prior to testing according to ASTM D-244, the emulsions are stored at 70° C. for 16 hours.

The aggregates of the invention paving slurry seal mixtures are densely graded aggregates which range in size from anything passing through a No. 4 sieve and at least 80% retained on 200 mesh.

Aggregate mixing tests are performed by mixing the aggregate with water and aqueous bituminous emulsion. An inorganic additive-mineral filler, such as portland cement, hydrated lime, limestone dust and fly ash, may be added to accelerate or retard set/break time and organic salts, such as ammonium sulfate, or emulsifiers may be added to retard the set/break of the slurry system. Such additives shall comply with the requirements of ASTM D-242. The materials are mixed in a mixing bowl until a homogeneous slurry mixture is obtained. The inability to form a stable slurry within 3 to 4 minutes of mixing time when proper proportions of each ingredient are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel, the slurry is considered to be "set." The cure time could also be measured with a cohesion testing device. Many other tests such as described in ASTM D-3910 are used to measure strength and other physical properties of slurry. The Performance Guide for Slurry Seal published by the Asphalt Emulsion Manufacturers Association is used to measure the performance of the slurry seal.

The emulsion should be stable during mixing and should set within the designed time period following application. The emulsifiers of this invention perform very satisfactorily without auxiliary emulsifiers. For instance, the setting times can be controlled with the concentration of emulsifier, the addition of lime, cement or other inorganic additive or an organic additive, which would alter the break characteristics of the slurry system. An organic additive-polymer latex may also be employed to strengthen the matrix. The organic additive is preferably added to the emulsion-aggregate slurry.

Either a mixture of tall oil fatty acids, preferably tall oil pitch, can be added to the bitumen (asphalt) prior to emulsification to improve break or improve the viscosity of the emulsion, or blends of the above described amidoamines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. Others are fatty monoquaternary ammonium salts and fatty diquaternary diammonium salts and nonionic emulsifiers, such as ethylene glycol polyethers of nonyl- or dodecyl phenol. Combinations of amidoamines based on fatty monocarboxylic acids, of various sources and the $C_{19}$- and $C_{21}$-dicarboxylic acids or $C_{22}$-tricarboxylic acid or anydrides disclosed in this invention can also be obtained by reacting the modified polyamines with a blend of fatty monocarboxylic acids and di- or tricarboxylic acids or anydrides. Monocarboxylic acids suitable for this purpose are tall oil fatty acids, crude tall oil, rosin acids, tall oil pitch, tallow fatty acids, soya fatty acids and the like. Kraft lignin, oxidized lignin, desulfonated sulfite lignin or VINSOL, a wood rosin oxidation product, may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer Acids."

The emulsions prepared with these polyaminoamide condensates disclosed in this invention are stable and can be stored for a long period of time until required for use. The cationic aqueous bituminous emulsions employed in the invention slurries are slow-setting, mixing grade slurries under ASTM D-2937; however, the set time may be shortened by adding lime or cement, providing an emulsion with quick-setting characteristics.

General Method of the Preparation of the Aldehyde Condensates

A) Preparation with Solid Aldehydes such as Paraformaldehyde

One hundred parts of polyamine blend with the average molecular weight 140 were heated to 150° C. At this temperature 10-50 parts of paraformaldehyde were added in small portions to prevent excess foaming; it was heated slowly to 180° C. and kept at this temperature until all the distillate was collected.

B) Preparation with Aqueous Solutions of Aldehydes

One hundred parts of the above polyamine blend were heated to 50° C., and 25-125 parts 37% formaldehyde solution or 10αparts of 40% glyoxal solution were added dropwise. After all the aldehyde was added, it was slowly heated to 150° C. and the distillate collected in a Dean Stark trap.

C) At the temperature range of 150-180° C., 100 to 150 parts of tall oil fatty acid or $C_{19}$-, $C_{21}$-dicarboyxlic acid, $C_{22}$-tricarboxylic acid or anhydride, petroleum-derived fatty acids, vegetable oils, animal fats, resin acids (rosin) and their reaction products with maleic anhydride, fumaric acid, acrylic acid and metacrylic acid, or their sulfonated or epoxidized derivatives are added and heated to 200-250° C. until all the distillate is collected. It is cooled to 100-150° C. and a suitable solvent such as ethylene glycol or isopropanol is added to lower the viscosity of the final product.

The practices of this invention may be seen in the following examples wherein the preparation of various types of emulsifiers and types of slurries of the invention is described.

EXAMPLE 1

This example gives the procedure the particular invention emulsifiers.

Emulsifier A
(Control I)

One hundred fifty grams dimer fatty acid heads (OCD-128) were blended with 100 grams of a polyethylene amine mixture with the average molecular weight 140 and heated to 220° C. When all the distillate was collected in the Dean Stark trap, it was cooled and the product discharged.

Emulsifier B, C, D

One hundred grams of a polyethylene amine mixture with the average molecular weight 140 were heated to 140° C. and 10 grams (B), 20 grams (C), 30 grams (D) paraformaldehyde added in small increments. The temperature was kept at this temperature until all the distillate was collected. Then, 150 grams dimer fatty acid head (OCD-128) were added slowly, and the reaction mixture was heater to 220°-230° C. until all the water of condensation was collected. It was cooled and discharged. The composition and properties of OCD-128 are as follows:

| Palmitic Acid | 11% | Acid Number: | 172 |
|---|---|---|---|
| Palmitoleic Acid | 5% | Saponification Number: | 178-180 |
| Isostearic Acid | 7% | Iodine Value: | 58 |
| Stearic Acid | 17% | Rosin Content: | 2% |
| Oleic Acid | 41% | Unsaponifiables: | 9% |
| Linoleic Acid Isomers | 4% | | |
| Others | 15% | | |

Emulsifier E
(Control II)

This emulsifier was prepared in the same way as Emulsifier A; but instead of OCD-128, INDUSOL L-5 tall oil fatty acid (primarily linoleic acid (40-45%), oleic acid (40%), and rosin acid (5%)) was used.

Emulsifier F, G

These emulsifiers were prepared in the same way as Emulsifiers B, C, D. Instead of OCD-128, INDUSOL L-5 tall oil fatty acid was used. One hundred grams of the above polyethylene amine mixture was reacted with 20 grams (F) and 30 grams (G) paraformaldehyde.

Emulsifier H (Control III)

One hundred grams of a 60:40 blend of tall oil fatty acid and $C_{22}$-tricarboxylic acid were mixed with 100 grams of a polyethylene amine blend with the average molecular weight of 140. It was heated to 230° C. until all the distillate was collected in the Dean Stark trap. It was cooled to 100° C. and discharged.

Emulsifier I, J

One hundred grams of the above polethylene amine blend were heated to 150° C; and 20 grams (I), 40 grams (J) paraformaldehyde were added in small increments. It was heated until all the condensate water was collected. Then, 100 grams of the blend 60:40 blend of tall oil fatty acid and $C_{22}$-tricarboxyic acid were added and heated to 240° C. until all the distillate was collected. It was cooled to 100° C. and discharged.

Emulsifier K

To 100 grams of a polyamine blend with the average molecular weight of 140, 25 grams of a 40% aqueous solution of glyoxal were added with stirring. It was heated to 150° C. and tall oil fatty acid (L-5) added. The temperature was further increased to 240° C. and the reaction mixture heated until all the distillate had been collected. It was cooled to 130° C. and the product discharged.

EXAMPLE 2

A cationic aqueous bituminous emulsion was prepared employing each of the Emulsifiers A through D of Example 1 and aggregate mixing tests with each emulsion as previously performed.

First, cationic emulsions were prepared with either 64% Exxon ® 120/150 penetration asphalt, 1.5% emulsifier at pH 1.5 (adjusted with hydrochloric acid) and water to make up 100% (percentages based on the weight of the emulsion).

Next, slurries were prepared by mixing two grams Portland cement, 100 grams of Camak (Ga.) granite screenings aggregate, 16 grams of the cationic aqueous bituminous emulsion, 10 grams water. The mixing temperature was 75° F., and the mixing time was 60 seconds.

This example illustrates the improved mixing stability and curing performance of slurries containing emulsions prepared with the invention emulsifiers (Table I) as compared with commercial cationic slurry seal emulsifiers and the control.

The slurry curing time was determined with means of a modified ASTM D-3910 cohesive strength tester. The modified cohesive tester consists essentially of (1) a frame, (2) instrument panel, (3) pressure gauge, (4) pressure regulator, (5) 4-way air valve and (6) a double-rod air cylinder mounted vertically so that a (7) rubber faced foot when lowered by air pressure against a specimen may be manually twisted to failure by a (8) peak-reading torque wrench.

Specimens are prepared and cast in a 60 mm diameter mold. A 6 mm-deep mold is used for aggregates 100% passing the 4.75 mm (#4 or 3/16") sieve and a 10 mm-deep mold is used for aggregates 100% passing the 8 mm (5/16") sieve. The specimens are cast on 10 cm (4") squares of non-absorptive 16-pound bitumen saturated roofing felt. This felt has been used for specimen mountings of all the data presented in this paper.

The modified cohesion tester is similar to the Armak ASTM D-3910-80 machine except that it is designed for a constant regulated air supply, convenient 4-way cylinder valve to operate the cylinder at controlled rate of speed. The cylinder is larger and more rugged. The contact foot used here is a flat $\frac{1}{4}$" neoprene disc of 50–60 durometer hardness, 1–18" diameter rather than a 1" diameter plug cut from an automobile tire. The procedures used may be found in Appendix A (ISSA Technical Bulletin TB #139 12/82). The pressure exerted on the foot is 92.3% of the gauge reading. The test procedure is set at 200 kPa (28.44 psi) and the cylinder foot is lowered against the centered specimen and allowed to compact the specimen for 5 to 6 seconds. The torque meter is placed on the upper cylinder rod end and twisted by hand in a firm smooth horizontal motion through 90° to 120° of arc within 0.7 to 1.0 second. The maximum torque pointer is read and the results recorded, the foot raised and cleaned and torque pointer is reset.

A series of specimens are prepared by casting a fresh mixture into 6 mm diameter rings 6 to 10 mm thick and centered on a non-absorbent surface such as 10 cm squared of 15-pound saturating roofing felt. The number of data points during a specified time span determines, of course, the number of specimens and amount of mix required. Peak torques are recorded at 15, 30, 60, 90 minutes.

TABLE I

EVALUATION OF CATIONIC SLURRY SEAL EMULSIONS

Exxon - 120/150 Penetration Asphalt: 64%
Emulsifier: 1.5%, pH Value 1.5
Aggregate: Granite (Camak), 2% Portland Cement based on the Weight of the Aggregate
Mixing Time: 60 Seconds

| Emulsifier | Cohesive Strength (kg × cm) After (min.) | | | |
|---|---|---|---|---|
| | 15 | 30 | 45 | 60 |
| Peral 417 | 9.8 | 9.8 | 10.8 | 11.6 |
| Emulsifier A (Control I) | emulsion broke prematurely | | | |
| Emulsifier B | 11.5 | 16.7 | 16.6 | 20+ |
| Emulsifier C | 13.6 | 14.1 | 16.3 | 18.4 |
| Emulsifier D | 13.4 | 15.0 | 18.0 | 20.2 |
| Emulsifier K | 13.0 | 15.7 | 17.6 | 22.9 |

Increased rate of strength development allows earlier re-opening of the re-surfaced road to rolling traffic.

EXAMPLE 3

This example relates to a cationic aqueous bituminous emulsion containing cationic polymer latex employing Emulsifiers E, F, G of Example 1 and aggregate mixing tests with each emulsion as previously performed.

First, cationic emulsions were prepared by using 64% of an Exxon 120/150 penetration asphalt/Downright ® CL-300 (Dow Chemicals) latex mix. This blend was prepared by adding 3% of the cationic latex (63% solids) to the soap solution containing 1.5% emulsifier and adjustment to pH 2.0. The fluidized asphalt and latex containing emulsifier solution were intimately mixed in a colloid mill for 30 seconds.

Next, 100 grams aggregate (granite), 14 grams water containing 0.08–0.1% alum (based on the weight of the aggregate), and 12 grams bituminous emulsion were mixed for 30 seconds in a mixing bowl and placed into 150 -inch deep rings for strength testing (ASTM D-3910). Mixing temperature was 75° F.

This example (Table II) illustrates the improved mixing stability and improved curing rate (Table III) of the emulsions prepared with the invention emulsifiers.

TABLE II

EVALUATION OF CATIONIC SLURRY SEAL EMULSIONS CONTAINING CATIONIC POLYMER LATEX

| Emulsifier | % Alum | Cohesive Strength (kg × cm) After (min.) | | | |
|---|---|---|---|---|---|
| | | 15 | 30 | 45 | 60 |
| Emulsifier E (Control II) | 0.08 | emulsion broke prematurely | | | |
| | 0.1 | emulsion broke prematurely | | | |
| Emulsifier F | 0.08 | 10.3 | 11.1 | 11.9 | 14.9 |
| Emulsifier G | 0.1 | 9.1 | 12.2 | 15.2 | 20+ |

TABLE III

EVALUATION OF CATIONIC SLURRY SEAL EMULSIONS CONTAINING CATIONIC LATEX

| Emulsifier | % Alum | Cohesive Strength (kg × cm) After (min.) | | | |
|---|---|---|---|---|---|
| | | 15 | 30 | 45 | 60 |
| Emulsifier H (Control III) | 0.04 | 9.6 | 11.8 | 12.0 | 14.1 |
| Emulsifier I | 0.08 | 8.6 | 9.7 | 12.7 | 20+ |
| Emulsifier J | 0.04 | 15.0 | 17.3 | 20+ | 20+ |
| Peral 417 | 0.04 | 9.5 | 10.7 | 9.2 | 10.6 |
| Redicote 100 | 0.04 | 9.8 | 9.7 | 11.6 | 14.2 |
| Catimuls 101 | 0.04 | emulsion broke prematurely | | | |

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A composition of matter obtained by reacting a modified polyamine with certain reactants selected from the group consisting of polycarboxylic acids and anhydrides of the general formulae

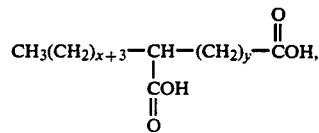

-continued

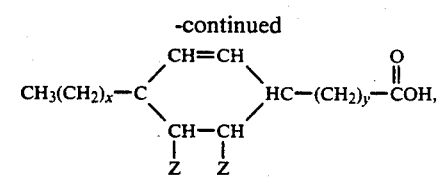

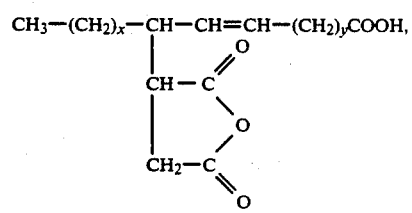

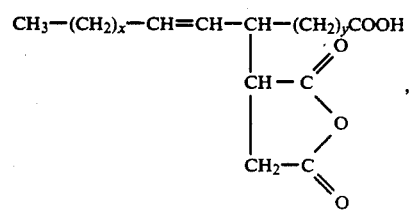

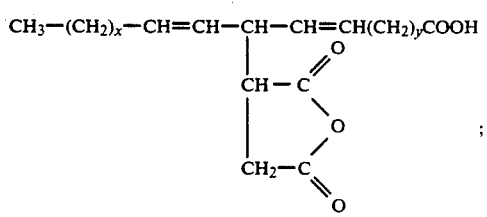

; and

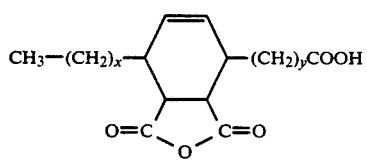

wherein x and y are integers from 3 to 9, x and y together equal 10-14, at least one Z is a carboxylic acid group and any remaining Z is hydrogen and wherein the modified polyamine is obtained by methylene-crosslinking a polyalkylene amine with an aliphatic or aromatic aldehyde.

2. The composition of matter of claim 1 wherein the modified polyamine and the certain reactants are co-reacted with a member of the group consisting of kraft lignin, desulfonated lignousulfonates, oxidized wood rosin, and dimerized fatty acids.

3. The composition of claim 1 wherein the aldehyde is formaldehyde or glyoxal.

4. A method of forming a paving slurry seal mixture of an aqueous bituminous emulsion and mineral aggregate capable of being worked at a temperature 65-80° F. comprising, mixing
   (1) mineral aggregate,
   (2) from about 8% to about 20% of an oil in water type emulsion, based on the weight of the mineral aggregate, wherein the emulsion is comprised of from about 55% to about 65% bitumen, based on the weight of the emulsion, from about 0.5% to about 2% of a cation-active emulsifier, based on the weight of the emulsion, wherein the emulsifier is obtained by reacting a modified polyamine with polycarboxylic acids and anhydrides of the general formulae

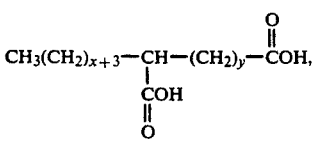

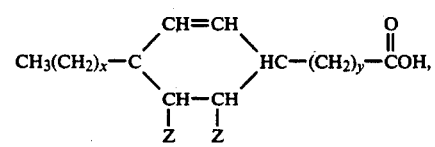

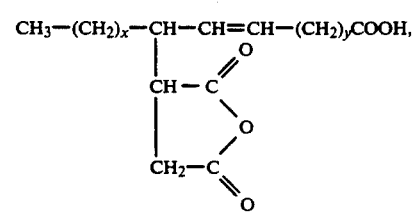

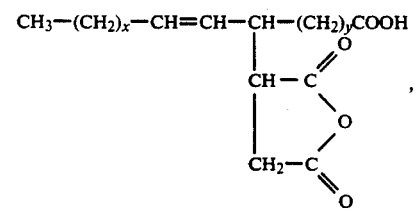

; and

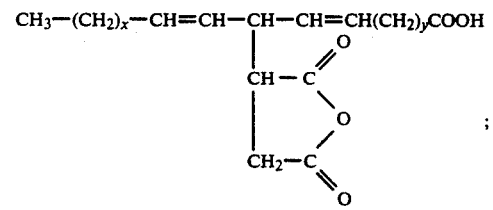

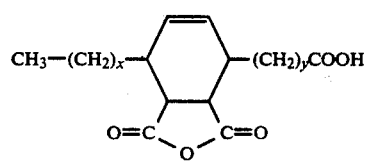

wherein x and y are integers from 3 to 9, x and y together equal 10-14, at least one Z is a carboxylic acid group and any remaining Z is hydrogen and wherein the modified polyamine is obtained by methylene-crosslinking a polyalkylene amine with an aliphatic or aromatic aldehyde, and
   (3) water to make up 100% by weight of the emulsion, and from about 4% to about 16% additional water, based on the weight of the aggregate, to form a slurry of the aggregate and the emulsion.

5. The method of claim 4 wherein the emulsifier is obtained by co-reacting the modified polyamine and the polycarboxylic acids or anhydride with a member of the group consisting of kraft lignin, desulfonated lignosulfonates, oxidized wood rosin, or dimerized fatty acids.

6. The method of claim 4 wherein from 3% to 10% of the bitumen content is substituted with a latex mix.

* * * * *

UNITED STATES PATENT AND TRADEMARK OFFICE
CERTIFICATE OF CORRECTION

PATENT NO.   : 5,160,453
DATED        : November 3, 1992
INVENTOR(S)  : Peter Schilling It is certified that errors appear in the above-identified patent and that said Letters Patent is hereby corrected as shown below:

On the cover page, under References Cited, delete "4,450,115" and substitute therefor --4,450,011--.

On the cover page, in the Abstract, line 6, delete "plycarboxylic" and substitute therefor --polycarboxylic--.

In column 1, line 30, before through, insert --all--.

In column 1, line 42, before use, insert --to--.

In column 1, line 61, after bonded, insert --to--.

In column 3, line 4, delete "suitable" and substitute therefor --usable--.

In column 3, line 25, between first and second formulae, insert --or--.

In column 4, line 27, delete "on" and substitute therefor --to--.

UNITED STATES PATENT AND TRADEMARK OFFICE
CERTIFICATE OF CORRECTION

PATENT NO.   : 5,160,453
DATED        : November 3, 1992
INVENTOR(S)  : Peter Schilling It is certified that errors appear in the above-identified patent and that said Letters Patent is hereby corrected as shown below:

In column 4, line 57, delete "aminoethylpiperzine" and substitute therefor --aminoethylpiperazine--.

In column 6, line 65, delete "or" and substitute therefor --and--.

In column 7, line 12, delete "alehyde" and substitute therefor --aldehyde--.

In column 7, line 18, delete "to" and substitute therefor --of--.

In column 8, lines 46 and 47, delete "any-drides" and substitute therefor --anhydrides--.

In column 8, line 50, delete "anydrides" and substitute therefor --anhydrides--.

In column 9, line 17, delete "10αpart" and substitute therefor --10-60 parts--.

UNITED STATES PATENT AND TRADEMARK OFFICE
CERTIFICATE OF CORRECTION

PATENT NO.   : 5,160,453
DATED        : November 3, 1992
INVENTOR(S)  : Peter Schilling It is certified that errors appear in the above-identified patent and that said Letters Patent is hereby corrected as shown below:

In column 9, line 32, delete "practices" and substitute therefor --practice--.

In column 9, line 38, before particular, delete "the" and substitute therefor --for--.

In column 9, line 58, delete "heater" and substitute therefor --heated--.

In column 10, line 28, delete "polethylene" and substitute therefor --polyethylene--.

In column 10, line 34, delete "tricarboxyic" and substitute therefor --tricarboxylic--.

In column 11, lines 28 and 29, delete "proc-dure" and substitute therefor --pressure--.

In column 11, line 39, delete "to" and substitute therefor --or--.

UNITED STATES PATENT AND TRADEMARK OFFICE
CERTIFICATE OF CORRECTION

PATENT NO.   : 5,160,453
DATED        : November 3, 1992
INVENTOR(S)  : Peter Schilling It is certified that errors appear in the above-identified patent and that said Letters Patent is hereby corrected as shown below:

In column 12, line 15, delete "150-inch" and substitute therefor --1/8-inch--.

In column 13, line 51, delete "lignousulfonates" and substitute therefor --lignosulfonates--.

In column 14, line 12, delete "$CH_3(CH_2)_x-C$" and substitute therefor --$CH_3(CH_2)_x-CH$--.

Signed and Sealed this

Second Day of November, 1993

Attest:

BRUCE LEHMAN

Attesting Officer            Commissioner of Patents and Trademarks